(12) United States Patent
Ulrich et al.

(10) Patent No.: US 11,292,448 B2
(45) Date of Patent: Apr. 5, 2022

(54) LONGITUDINAL DRIVER ASSISTANCE SYSTEM IN A MOTOR VEHICLE

(71) Applicant: Bayerische Motoren Werke Aktiengesellschaft, Munich (DE)

(72) Inventors: Holger Ulrich, Munich (DE); Stefan Knoller, Munich (DE); Walter Kagerer, Munich (DE); Andreas Lechner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 178 days.

(21) Appl. No.: 16/100,941

(22) Filed: Aug. 10, 2018

(65) Prior Publication Data

US 2018/0345948 A1 Dec. 6, 2018

Related U.S. Application Data

(63) Continuation of application No. PCT/EP2017/051495, filed on Jan. 25, 2017.

(30) Foreign Application Priority Data

Feb. 15, 2016 (DE) .................. 10 2016 202 271.7
Apr. 4, 2016 (DE) .................. 10 2016 205 508.9

(51) Int. Cl.
*B60W 10/06* (2006.01)
*B60W 10/184* (2012.01)
(Continued)

(52) U.S. Cl.
CPC .......... *B60W 10/06* (2013.01); *B60W 10/184* (2013.01); *B60W 30/143* (2013.01);
(Continued)

(58) Field of Classification Search
CPC .. B60W 10/06; B60W 30/143; B60W 50/085; B60W 30/146; B60W 10/184;
(Continued)

(56) References Cited

U.S. PATENT DOCUMENTS 9,159,235 B2 10/2015 Hegemann et al.
2014/0074370 A1 3/2014 Johansson et al.
(Continued)

FOREIGN PATENT DOCUMENTS

CN 103534741 A 1/2014
CN 103857574 A 6/2014
(Continued)

OTHER PUBLICATIONS

PCT/EP2017/051495, International Search Report dated May 9, 2017 (Two (2) pages).
(Continued)

*Primary Examiner* — Nga X Nguyen
(74) *Attorney, Agent, or Firm* — Crowell & Moring LLP

(57) ABSTRACT

A longitudinal driver assistance system in a motor vehicle includes a capture system configured to detect upcoming relevant events which require adaptation of a predefined maximum permissible top speed, and a functional unit which, upon detecting an upcoming relevant event, is configured to determine, based on a location of the upcoming relevant event, a first location or first time, the reaching of which causes the functional unit to output a notification to a driver of the vehicle relating to an automatic adaptation of the maximum permissible top speed. The functional unit is also configured to determine a second location or time to be reached after the first location or first time, respectively, the reaching of which causes the functional unit to intervene in a longitudinal guidance of the motor vehicle in a direction of a new maximum permissible top speed at the location of the
(Continued)

upcoming relevant event if there is no driver-initiated refusal of the automatic adaptation of the maximum permissible top speed. Upon detecting the upcoming relevant event, the functional unit is configured to determine a third location or third time to be reached after the second location or second time, respectively, up to which point a driver-initiated refusal of the automatic adaptation of the maximum permissible top speed is permitted.

16 Claims, 3 Drawing Sheets

(51) Int. Cl.
  *B60W 30/14* (2006.01)
  *B60W 50/08* (2020.01)
  *B60W 50/14* (2020.01)
  *B60W 50/00* (2006.01)

(52) U.S. Cl.
  CPC ........ *B60W 30/146* (2013.01); *B60W 50/085* (2013.01); *B60W 2050/0075* (2013.01); *B60W 2050/146* (2013.01); *B60W 2420/42* (2013.01); *B60W 2540/215* (2020.02); *B60W 2555/60* (2020.02); *B60W 2556/45* (2020.02); *B60W 2556/50* (2020.02); *B60W 2720/106* (2013.01)

(58) Field of Classification Search
  CPC ......... B60W 2556/50; B60W 2555/60; B60W 2540/215; B60W 2720/106; B60W 2420/42; B60W 2050/146; B60W 2050/0077
  See application file for complete search history.

(56) References Cited

U.S. PATENT DOCUMENTS

| | | |
|---|---|---|
| 2014/0277987 A1 | 9/2014 | Rogalski et al. |
| 2014/0371974 A1* | 12/2014 | Huelsebusch ...... B60K 31/0008 701/23 |
| 2018/0222478 A1* | 8/2018 | Limbacher ............ B60W 10/04 |

FOREIGN PATENT DOCUMENTS

| | | | |
|---|---|---|---|
| CN | 104125906 A | 10/2014 | |
| CN | 104417554 A | 3/2015 | |
| CN | 104903138 A | 9/2015 | |
| CN | 105172791 A | 12/2015 | |
| DE | 10 2007 005 245 A1 | 11/2007 | |
| DE | 10 2008 018 421 A1 | 9/2009 | |
| DE | 10 2012 211 967 A1 | 1/2014 | |
| DE | 102012211967 A1 * | 1/2014 | .......... B60W 30/143 |
| DE | 10 2013 102 087 A1 | 9/2014 | |
| DE | 10 2014 017 522 A1 | 6/2015 | |
| DE | 102014017522 A1 * | 6/2015 | .......... B60W 30/143 |
| DE | 10 2014 215 673 A1 | 2/2016 | |

OTHER PUBLICATIONS

German Search Report issued in German counterpart application No. 10 2016 205 508.9 dated Jan. 20, 2017, with Statement of Relevancy (Nine (9) pages).

Chinese Office Action issued in Chinese application No. 201780009718.9 dated Aug. 27, 2020, with English translation (Seventeen (17) pages).

* cited by examiner

LONGITUDINAL DRIVER ASSISTANCE SYSTEM IN A MOTOR VEHICLE

CROSS REFERENCE TO RELATED APPLICATIONS

This application is a continuation of PCT International Application No. PCT/EP2017/051495, filed Jan. 25, 2017, which claims priority under 35 U.S.C. § 119 from German Patent Applications Nos. 10 2016 202 271.7, filed Feb. 15, 2016, and 10 2016 205 508.9, filed Apr. 4, 2016 the entire disclosures of which are herein expressly incorporated by reference.

BACKGROUND AND SUMMARY OF THE INVENTION

The invention relates to a longitudinal driver assistance system in a motor vehicle.

Basically, a large number of longitudinal driver assistance systems are already known. The most common systems include the longitudinal driver assistance systems which are in the form of cruise control systems and control the speed of the motor vehicle to a predefined desired or maximum permissible top speed. In addition to these longitudinal control systems, nowadays it is also already possible to acquire longitudinal control systems which have added distance control, so-called adaptive longitudinal control systems or cruise control systems, from some manufacturers. Such systems which are offered, for example, under the designation "active cruise control" by the applicant of the present patent application make it possible to automatically drive the motor vehicle at a desired or a correspondingly lower speed while maintaining a desired distance from a vehicle traveling in front. If a distance sensor system which is fitted to the motor vehicle and can operate, in particular, on a radar basis detects a target object or (motor) vehicle traveling in front in the lane of the vehicle in question, the speed of the vehicle in question is adapted to the speed of the motor vehicle traveling in front or of the target object, for example by bringing about a suitable braking torque, in such a way that a distance control means which is contained in the "active cruise control" or in the corresponding longitudinal control system automatically adjusts and maintains a situation-appropriate distance from the motor vehicle or target object traveling in front.

Furthermore, longitudinal driver assistance systems which are in the form of so-called speed-limiting systems and prevent the maximum permissible speed set by the driver from being exceeded are known.

DE 10 2012 211 967 A1 describes a combination of a speed-limiting system and a cruise control system, wherein the maximum permissible top speed of the speed-limiting system can be adopted as the (new) desired or target speed for the cruise control instead of the set speed which is set.

Finally, relatively new vehicles also contain driver assistance systems which can detect a speed limit either from map data of a navigation system and/or by means of image processing, and can indicate said speed limit to the driver permanently from the point when the speed limit is reached, with the result that the driver can independently adapt his speed to the speed limit as required (e.g. BMW Speed Limit Info).

DE 10 2008 018 421 A1 discloses a driver assistance system for transmitting and receiving speed data and/or traffic density data for controlling a cruise control system, which driver assistance system determines a maximum permissible top speed on the basis of the received data and communicates said maximum permissible top speed to the driver by outputting a corresponding notification. The driver can adopt this specification of the permissible speed by means of a simple actuation process for his cruise control system.

DE 102014215673 A1 likewise discloses a longitudinal driver assistance system which, when an upcoming event which requires a reduction in speed is detected, determines a deceleration strategy and, at a defined time before the event is reached, outputs a request notification to the driver to approve the automatic implementation of the deceleration strategy. If the driver confirms the request notification, automatic implementation of the deceleration strategy is brought about. The detection unit can determine or detect a relevant event here either on the basis of map data (for example of a navigation device) or on the basis of camera data.

Such longitudinal driver assistance systems which, taking into account an upcoming speed limit, automatically adapt the longitudinal control taking into account the speed limit, if the driver does not actively refuse this before the intervention, are likewise known.

The object of the invention is now to provide an improved longitudinal driver assistance system having an acceptance and refusal strategy which can be understood by the driver.

The longitudinal driver assistance system according to the invention for a motor vehicle for the open-loop or closed-loop control of a drive and/or braking unit taking into account a predefined maximum permissible top speed substantially comprises a capture system for detecting upcoming relevant events which require adaptation of the predefined maximum permissible top speed, and a functional unit which, upon detecting an upcoming relevant event, is set up to determine, on the basis of the location of the relevant event, a first location or first time, the reaching of which causes a notification relating to the imminent automatic adaptation of the maximum permissible top speed to be output to the driver. The functional unit is also set up to determine a second location or second time (to be reached after the first location or first time), the reaching of which causes intervention in the longitudinal guidance of the motor vehicle in the direction of the new maximum permissible top speed at the location of the upcoming event, in particular in order to reach or maintain the (new) maximum permissible top speed at the upcoming location of the relevant event, if there is no driver-initiated refusal of the automatic adaptation of the maximum permissible top speed.

The capture system may be a map-based and/or camera-based capture system for detecting relevant upcoming events. The relevant upcoming events may be, for example, temporary or permanent speed limits which are either directly indicated on a traffic sign or can be derived therefrom on the basis of the general traffic regulations (for example a speed limit to 50 km/h applies in Germany when driving through a built-up area). Likewise, the event in question may also be an event which cancels a speed limit or at least an event which increases to a new top speed, as is usually the case e.g. when leaving a built-up area.

The (new) maximum permissible top speed, which is decisive for the longitudinal driver assistance system, at the location of the upcoming event can be either the actually predefined new speed limit or a speed which deviates upwardly or downwardly from the predefined new speed limit by a predefined amount, wherein the amount and the direction of the deviation can, for example, also be adjustable by the driver in a central vehicle menu. This new top speed can be transmitted to the functional unit directly or can be determined only on the basis of the information available in the functional unit.

Alternatively or additionally, it is also possible for the driver to himself define speed limits in a location-based manner on a route which is known to him by means of a vehicle-internal or vehicle-external interface. These speed limits can correspondingly be taken into account as new top speeds when driving along the route with an active longitudinal guidance system. In this context, the driver can also select in advance e.g. whether he basically wishes to have all the self-defined speed limits taken into account, or only speed limits selected in accordance with a rule (e.g. only on a particular route, for particular road classes, at a particular time, depending on weather conditions, etc.). A plurality of speed profiles can also be created for a particular route section, and said speed profiles are then active according to predefined rules (speed profile for good road conditions, speed profile for wet roads and/or speed profile for snow-covered roads).

The term "the first location" or "the first time" can be understood as meaning, for example, a local time, the reaching of which prompts the output of the notification. The first location or the first time can be predefined on the basis of various available parameters, for example the current speed, the upcoming new maximum permissible top speed, the type of upcoming event, the road class, the road gradient, the time and/or the weather conditions. The notification to be output may be perceived, for example, as an optical and/or acoustic notification. For example, a corresponding display on a head-up display and/or in a navigation representation display or in the instrument cluster may be output.

A driver-initiated refusal can be given, for example, by actuating an operating element provided for this purpose. The operating element may be a pushbutton or switch which can be manually actuated. Alternatively, a driver-initiated refusal can also be given by actuating the brake pedal or the gas pedal. Furthermore, if confirmation of permission is detected while outputting the notification, the functional unit may also be set up to prompt intervention in the longitudinal guidance of the motor vehicle in the direction of, in particular in order to reach or maintain, the (new) maximum permissible top speed at the upcoming location of the relevant event not only when the second location or time is reached, but rather already before this, in particular after the time of the driver-initiated confirmation of permission. At the same time, if the confirmation of permission is available, withdrawal of the notification can be prompted and subsequent refusal can be prevented. If a (manually) triggered refusal of the automatic adaptation of the maximum permissible top speed is detected, the output of the notification is likewise withdrawn.

One or more coordinated strategies may be initiated after the second location or time, after which there is intervention in the longitudinal guidance of the motor vehicle in the direction of, in particular in order to reach or maintain, the (new) maximum permissible top speed at the upcoming location of the relevant event. For example, an acceleration or deceleration strategy having a plurality of stages (with different acceleration or deceleration) can be initiated, or two or more different acceleration or deceleration strategies which are strung together can be implemented. However, the decisive factor is that intervention is carried out after reaching the second location or time such that an acceleration (new maximum permissible top speed is greater than the current speed or the current maximum permissible top speed) or deceleration (new maximum permissible top speed is less than the current speed or the current maximum permissible top speed) is prompted on the basis of the new maximum permissible top speed at the location of the upcoming event and the current speed.

The invention is now based on the following consideration on the basis of the prior art: if a notification relating to the imminent automatic adaptation of the maximum permissible top speed is output if a relevant event is detected, early information is intended to be thereby output to the driver, on the one hand, but the driver is also simultaneously intended to be given the opportunity to prevent the automatic adaptation. This is useful, in particular, on account of the partially inaccurate or incorrect map data which are evaluated. If the driver now overlooks or fails to hear the notification, the automatic intervention in the longitudinal guidance of the motor vehicle in the direction of the (new) maximum permissible top speed at the upcoming location of the relevant event is carried out after a short time (at the second time or at the second location). If the driver only perceives the adaptation of the maximum permissible top speed as a result of the prompted intervention, he can no longer abort the system intervention which has already been started in the known systems. Only the opportunity to manually adapt the desired speed again or to (temporarily) deactivate the driver assistance system remains.

In order to prevent such a situation, upon detecting an upcoming relevant event, the invention also provides for the functional unit to be set up to determine a third location or third time (to be reached after the second location or second time), up to which a driver-initiated refusal of the automatic adaptation of the maximum permissible top speed is permitted despite the intervention in the longitudinal guidance which has already been started. In other words, after reaching the second location or the second time, after which adaptation of the longitudinal guidance in the direction of the new maximum permissible top speed or automatic intervention in the longitudinal guidance of the motor vehicle in order to reach or maintain the (new) maximum permissible top speed at the upcoming location of the relevant event has already taken place, the driver is given the opportunity to reverse this again.

The third location or third time can be advantageously determined or predefined firmly or on the basis of predefined parameters. In one particularly advantageous configuration of the invention, the third location or third time, up to which it is still possible to refuse the automatic adaptation of the speed to the new maximum permissible top speed, is identical to that time at which the new maximum permissible top speed is adjusted (for the first time) or has been reached for the first time.

Furthermore, the opportunity to refuse the automatic adaptation of the set speed, that is to say to return to the initially applicable set speed or maximum permissible top speed, can also be limited by the following boundary conditions:

The display relating to the imminent automatic adaptation of the maximum permissible top speed must already have been active for a predefined minimum period.

The display relating to the imminent automatic adaptation of the maximum permissible top speed must not be active for longer than a predefined maximum period.

After adjusting the new maximum permissible top speed, it is no longer possible to return or accept.

In one advantageous development, upon detecting a driver-initiated refusal of the automatic adaptation of the maximum permissible top speed, the functional unit can be set up to prevent the adaptation of the maximum permissible top speed (if the refusal is given before reaching the second location or the second time) or to prompt cancellation of intervention in the longitudinal guidance which has already been carried out in the direction of, in particular in order to reach or maintain, the new maximum permissible top speed at the location of the upcoming event (if the refusal is given after the second location or time and before the third location or time) before reaching the third location or the third time. In this case, if permitted driver-initiated refusal of the automatic adaptation of the maximum permissible top speed is detected, the functional unit can also be set up to prompt immediate intervention in the longitudinal guidance of the motor vehicle during the intervention in the longitudinal guidance which has already been prompted in the direction of the new maximum permissible top speed at the location of the upcoming event (that is to say if the refusal is given after the second location or time and before the third location or time) in order to reach or maintain the originally and currently still applicable maximum permissible top speed quickly or in good time.

After reaching the second location or time and if adaptation of the maximum permissible top speed is not refused, the functional unit is also advantageously set up to prompt intervention in the longitudinal guidance between the second location or time and the third location or time such that a (noticeable) acceleration or deceleration in the direction of the new maximum permissible top speed applicable at the location of the relevant event is achieved. In other words, a different acceleration or deceleration strategy can be implemented between the second location or time and the third location or time than that implemented after reaching the third location/time. The gradient of this acceleration or deceleration between the second location or time and the third location or time is advantageously lower than the gradient of the acceleration or deceleration after reaching the third location or time. In another advantageous configuration, if automatic adaptation of the maximum permissible top speed is permitted (only) in the case of a high differential speed between the previous speed limit and the newly detected speed limit (for example from 160 km/h to 80 km/h), a reduced acceleration/deceleration is applied for a defined period (for example a few seconds) so that the driver has time to return to the last set speed without inconveniently decelerating/accelerating the vehicle.

Furthermore, after reaching the third location or the third time, the functional unit is also advantageously set up to not permit a driver-initiated refusal of the automatic adaptation of the maximum permissible top speed, that is to say, if the driver has not actively refused the automatic adaptation of the maximum permissible top speed (for example by actuating an operating element provided for this purpose) before reaching the third location or time, the intervention which has already been initiated can no longer be terminated or reversed by a subsequent refusal. After this time, the driver can only abort the initiated automatic intervention or can adjust the maximum permissible top speed now applicable to the upcoming location by manually adjusting the desired or maximum permissible top speed or by (temporarily) deactivating the driver assistance system. In the event of a permitted driver-initiated refusal (that is to say before reaching the third location or time) of the automatic adaptation of the maximum permitted top speed, the functional unit can likewise be set up to deactivate the notification.

The longitudinal driver assistance system according to the invention can be used for various ways of assisting the driver with the longitudinal guidance.

The longitudinal driver assistance system may therefore be in the form of a speed-limiting system, for example, in which a maximum permissible limit speed can be predefined, and the functional unit is set up to prevent the predefined or set maximum permissible top speed from being exceeded by accordingly controlling the drive. If an upcoming event which requires adaptation of the maximum permissible top speed is now detected, the functional unit can be set up to then prompt output of a notification relating to the imminent automatic adaptation of the maximum permissible top speed at a defined first location or time before reaching the upcoming event, that is to say in a proactive manner. If the driver does not refuse the automatic adaptation by means of a corresponding operation, the functional unit prompts intervention in the longitudinal guidance of the vehicle after reaching the second location or time, with the result that the new maximum permissible top speed is no longer exceeded or can no longer be reached at the location of the upcoming event. Before reaching the third location or time, which is reached after the second location or time, the driver still has the opportunity to refuse the automatic adaptation despite the automatically initiated intervention in the longitudinal guidance. If the driver does so, the intervention is canceled or is adapted in such a manner that the currently permissible top speed is permitted as the limiting speed limit again.

In an alternative embodiment, the longitudinal driver assistance system may also be in the form of a cruise control system (with or without a distance function), wherein the maximum permissible top speed can be used as the desired speed. In this case, however, it is possible to predefine a restriction such that the maximum permissible top speed can be (temporarily) used as the new desired speed only when it is lower than a maximum permissible desired speed predefined by the driver. According to this restriction, the functional unit can be designed to prompt the output of a notification relating to the imminent automatic adaptation of the maximum permissible top speed or desired speed after the first location or time and, if not refused, to prompt adaptation of the cruise control taking into account this new desired speed after the second location or time only when the new maximum permissible top speed is not greater than the maximum desired speed predefined by the driver. It is therefore possible to ensure that the decision relating to the maximum permissible speed, which the driver would like to achieve during free travel, remains with the driver.

The invention is now explained in more detail on the basis of the following exemplary embodiment. In this case, Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
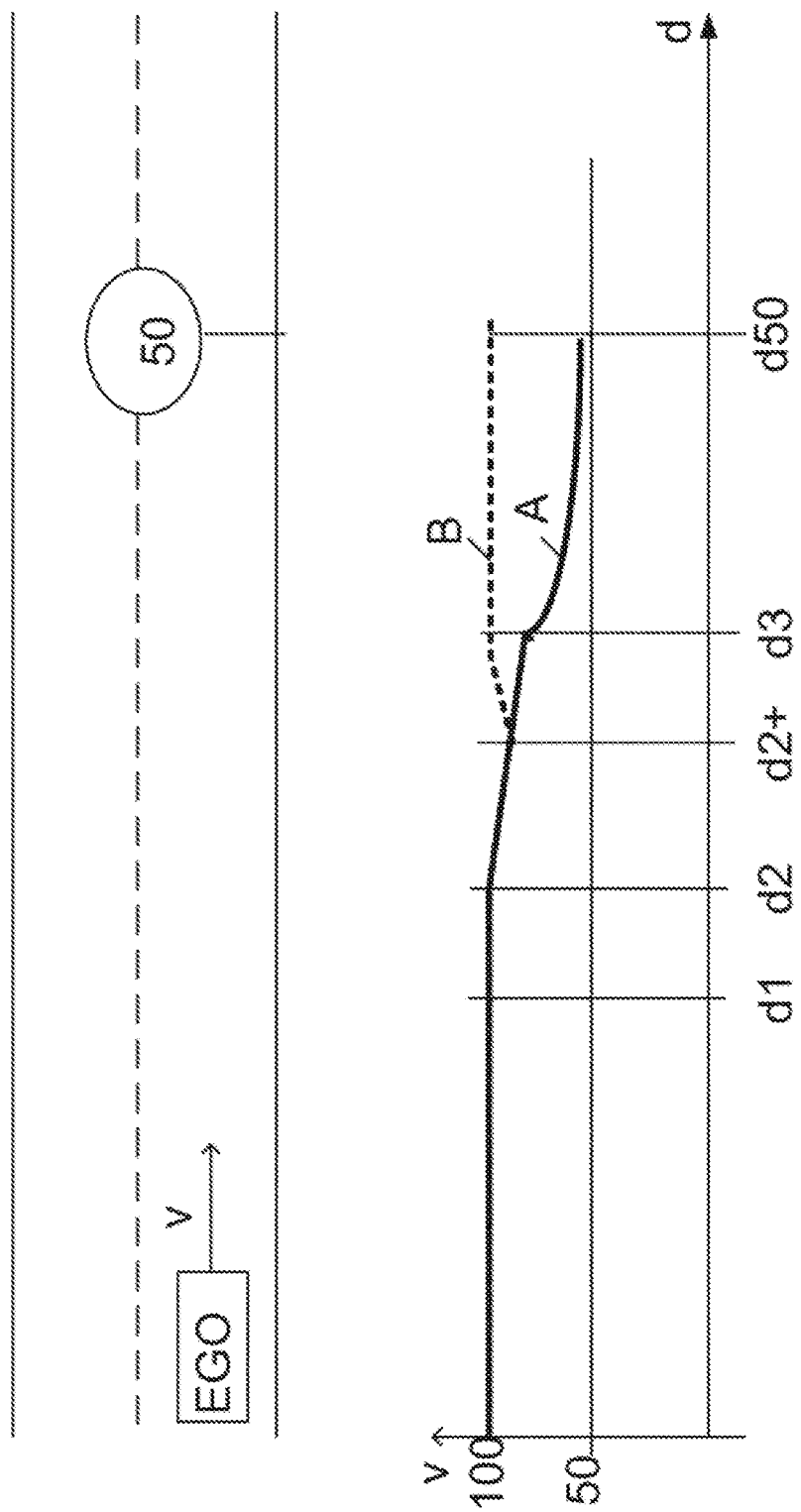
FIG. 1 shows a traffic situation, on the basis of which the invention is explained.

FIG. 1 shows the course of a road on which a motor vehicle is moving at a speed v of 100 km/h. A speed limit sign which allows a maximum permissible speed of 50 km/h is detected in a proactive manner.

A graph which spans the distance d and the speed v is illustrated below the course of the road and is used to illustrate the current speed of the vehicle when driving along the above route with an active cruise control system which comprises the invention.

At the start of the course of the road illustrated, the vehicle is moving at a speed of 100 km/h. As soon as the upcoming speed limit sign is detected, on account of which it is necessary to adapt the maximum permissible top speed to 50 km/h, the longitudinal driver assistance system begins to initiate a sequence of different outputs and interventions described in detail in FIG. 2.

At the location d1, an optical notification is first of all generated, which notification informs the driver that automatic adaptation of the speed will soon be started, on account of an upcoming event which requires adaptation of the maximum permissible top speed, if the driver does not prevent this by means of a corresponding action (for example by actuating a refusal button or the gas pedal). If there is no driver-initiated refusal, a slight noticeable deceleration in the direction of the upcoming speed limit is carried out after the location d2. Even during this deceleration phase, the driver still has the opportunity, before the location d3, to refuse the adaptation of the speed on account of the detected upcoming speed limit sign. After the location d3, a refusal is no longer possible and the driver assistance system prompts deceleration of the vehicle by means of an accordingly suitable deceleration strategy, with the result that the speed of the vehicle is only 50 km/h at the location d50 of the speed limit sign.

In the speed profile indicated with B, the driver refuses the adaptation of the speed in order to reach the maximum permissible top speed at the location of the speed limit sign by means of a corresponding operation at the time d2+, that is to say only after the beginning of the prompted deceleration of the vehicle. Immediately after the permitted refusal (since before the location d3), the driver assistance system causes the speed reduction which has already been carried out to be canceled again and causes the vehicle to be accelerated again to the currently applicable maximum permissible top speed.

Figure 2:
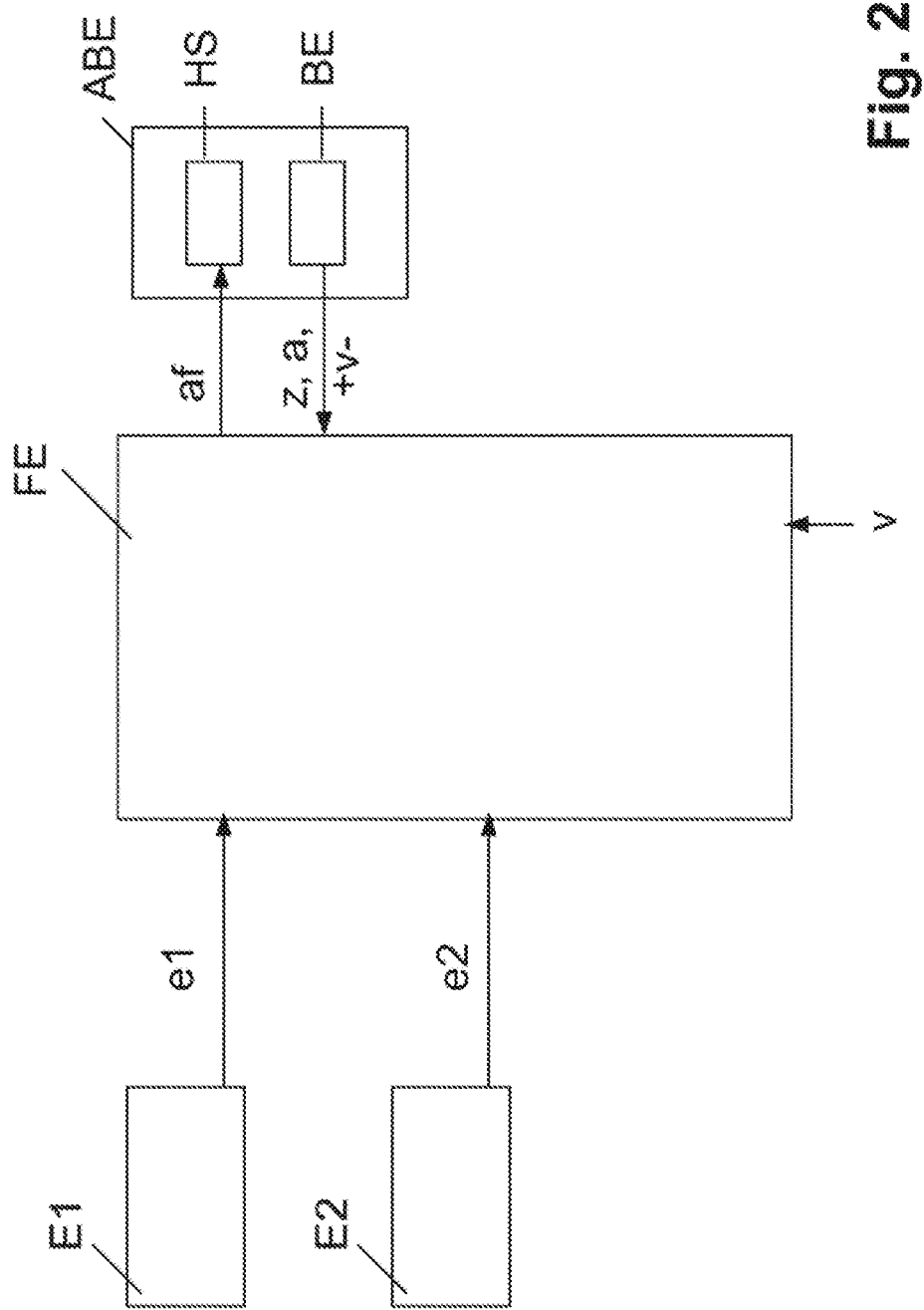
FIG. 2 shows an exemplary structure of a longitudinal driver assistance system which is in the form of a cruise control system in a motor vehicle and is intended to control the speed to a maximum permissible top speed.

FIG. 2 now shows in detail, as the central element of a longitudinal driver assistance system in the form of a cruise control system, a functional unit FE which substantially receives input signals e1 from a first capture unit E1, input signals e2 from a second capture unit E2, a speed signal v, a permission signal z for permitting automatic adaptation of the maximum permissible top speed, a refusal signal a for refusing the permission to automatically adapt the maximum permissible top speed and a signal +v− for manually adapting the maximum permissible top speed.

The first capture unit E1 is a map-based capture unit E1 which detects upcoming events, which require (for example speed limit) or allow (for example cancellation of a speed limit) adaptation of the maximum permissible top speed, on the basis of available map data, the vehicle's own position and a known upcoming route section.

The second capture unit E2 is a camera-based capture unit E2 which detects upcoming, speed-limiting events, which possibly require adaptation of the maximum permissible top speed to a new top speed, on the basis of the data from a forward-facing (for example video) sensor system.

Both the map-based capture unit E1 and the camera-based capture unit E2 are configured such that they can detect the location of the upcoming relevant event, that is to say also the level of the maximum permitted limit speed applicable after this location, and can forward it to the functional unit FE.

As soon as relevant data e1 or e2 relating to the location of an upcoming relevant event and the level of the maximum permitted limit speed after this location are available to the functional unit, the functional unit FE can first of all determine the maximum permissible top speed at the location of the upcoming event, possibly taking into account a driver specification. Alternatively, the transmitted maximum permitted limit speed can also be directly used as the maximum permissible top speed.

On the basis of available relevant data, for example the relative speed between the vehicle and the determined maximum permissible top speed, the distance to the relevant location and/or a determined deceleration strategy, the functional unit FE prompts the output of a notification relating to the imminent automatic adaptation of the maximum permissible top speed at a defined first location or time before reaching the relevant location by means of a corresponding signal of to a display operating unit ABE which comprises a notification system HS and an operating element BE.

This first time is somewhat before the time at which corresponding cruise control or a determined deceleration strategy would have to be implemented, with the result that the determined new top speed is reached at the location of the upcoming event. Depending on the configuration of the cruise control system, the output can basically be prompted according to a first alternative only when the determined new maximum permissible top speed is less than the maximum desired speed predefined by the driver. According to a second alternative, the output can be carried out irrespective of the maximum desired speed desired by the driver. The notification is output optically, for example as a display in the instrument cluster or a head-up display.

The operating element BE which can be used by the driver to actively permit or refuse the automatic adaptation is configured in such a manner that the driver can request manual adaptation of the maximum desired speed +v− at those times at which no request notification is output. The operating element BE is also configured in such a manner that, during output of the notification, the driver can actively confirm or permit (signal z) the automatic adaptation of the permissible top speed by means of a first type of actuation or can actively refuse (signal a) the requested permission to automatically adapt the maximum permissible top speed by means of a second type of actuation. Instead of the operating element described above, the driver can also refuse the automatic adaptation of the maximum permissible top speed by actuating the gas pedal (for example in the event of a deceleration request) or the brake pedal.

If the driver actively confirms the automatic permission, the speed is adapted in order to reach the maximum permissible top speed after reaching a determined second location or time. It is then no longer possible to refuse the automatic adaptation.

If the driver (initially) does not refuse the automatic adaptation of the maximum permissible top speed or actively permits it, the functional unit FE prompts noticeable intervention in the longitudinal control in the direction of the new maximum permissible top speed upon reaching a defined (second) location or time. In other words, the functional unit FE prompts a defined slight acceleration (firmly predefined or can be variably determined on the basis of various parameters) in the event of an increase (considered to be proactive) in the maximum permissible top speed and prompts a slight deceleration of the vehicle in the event of a reduction in the maximum permissible top speed.

As a result of this noticeable intervention, the driver is again intended to be notified of the imminent (or generally speaking already) started adaptation of the speed to the new maximum permissible top speed to be automatically adapted. The functional unit FE is now also designed to still permit and accordingly react to a driver-requested refusal of the automatic adaptation of the maximum permissible top speed in this phase as well. A refusal is no longer possible only when the vehicle has reached a defined third location or time.

According to these statements, the following additions should also be cited with respect to the refusal opportunity: if the driver actively refuses the automatic permission, the refusal is or is not permitted depending on the time of the driver intervention. As long as no intervention in order to reach the new maximum permissible top speed has yet been carried out, the adaptation of the maximum permissible top speed is prevented from the outset in the event of refusal and the display is deactivated by withdrawing the signal af.

If the intervention in the longitudinal guidance in order to reach the new maximum permissible top speed has already been started, the permission for the refusal depends on the time of the refusal. If the adaptation is refused before a determined (third) location or time, it is permissible and the functional unit FE prompts a change in the intervention in the longitudinal control which has already been started to the effect that the adaptation of the speed to the new maximum permissible speed is rejected again and control to the originally applicable maximum permissible speed is carried out again.

However, if the refusal is given only after reaching the (third) location, after which a refusal is no longer permitted, the intervention in the longitudinal control is changed depending on the original or "normal" meaning of the operating element. If the driver has actuated the operating element in order to increase the desired speed or the maximum permissible top speed after reaching the (third) location, for example, the maximum permissible top speed is either changed according to this actuation or the maximum permissible top speed is accordingly changed at the location of the upcoming relevant event. However, if the driver has actuated the gas pedal or brake pedal, the cruise control is overridden or is (temporarily) deactivated.

Figure 3:
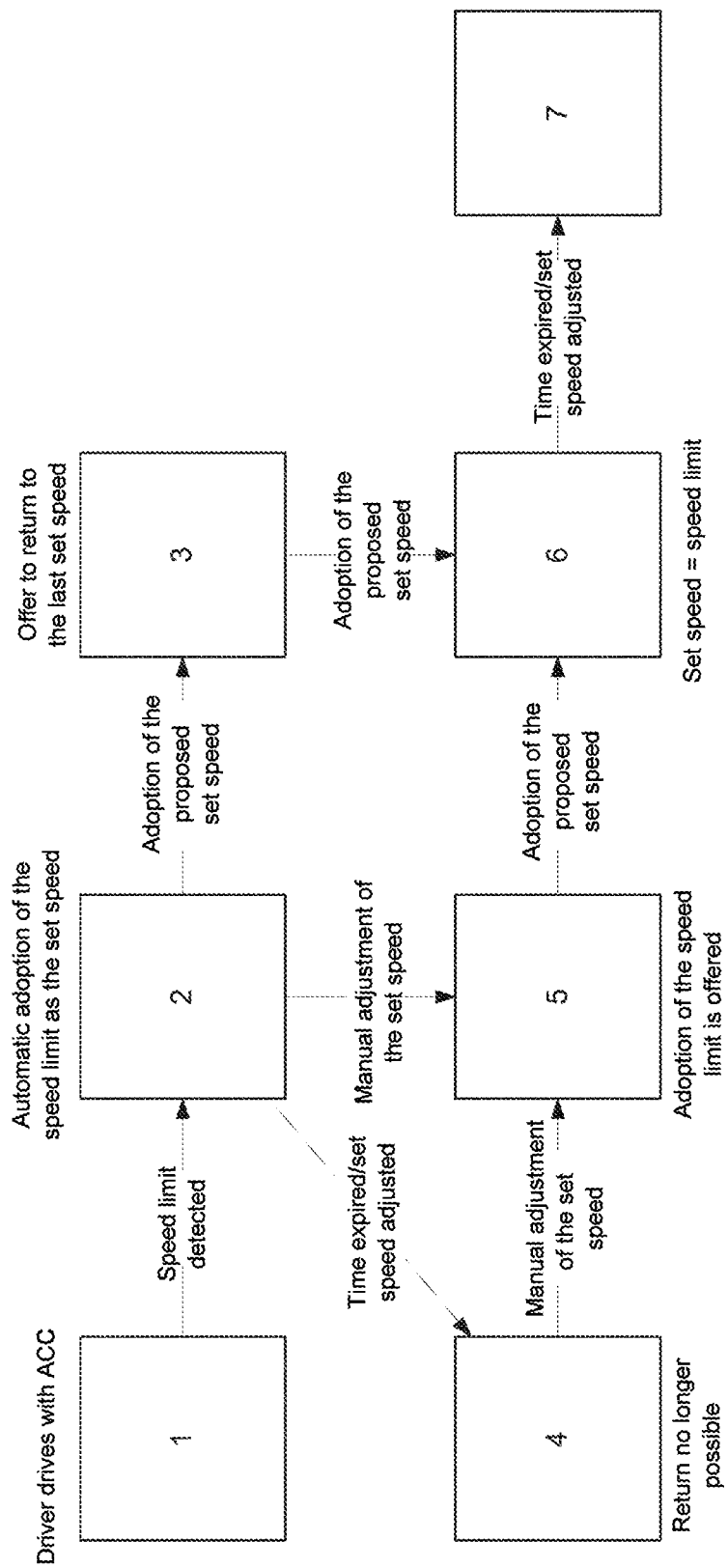
FIG. 3 shows a sequence of different states during cruise control with proactive detection of speed limits and automatic adaptation of the maximum permissible top speed.

FIG. 3 now shows a sequence of different states 1-7 during cruise control with proactive detection of speed limits and automatic adaptation of the maximum permissible top speed, wherein the sequence of states is illustrated as a state machine.

It is first of all assumed in state 1 that the vehicle is traveling at a currently applicable maximum permissible top speed of 130 km/h on account of the active cruise control ACC. As soon as an upcoming speed limit (70 km/h) which requires or allows adaptation of the maximum permissible top speed is detected using a suitable sensor system, a change is made from state 1 to state 2 at a defined first time before reaching the speed limit. At the same time, the detected upcoming speed limit (for example 70 km/h) is already adopted at this time as the applicable new maximum permissible top speed after the upcoming location, wherein the (automatic) adjustment is started only when this is useful, with the result that this new applicable maximum permissible top speed (70 km/h) is reached at the location of the speed limit as a result of the predefined acceleration or deceleration strategy. The maximum permissible top speed (130 km/h) which is still applicable is (temporarily) stored in a buffer.

If, starting from state 2, the driver does not refuse the automatic adaptation of the speed in order to reach the new maximum permitted top speed (70 km/h) within a predefined time window, the adjustment to this new maximum permissible top speed (70 km/h) is started after reaching a determined second location or time, with the result that this maximum permissible top speed is reached at the location of the start of the new speed limit. As soon as this new maximum permissible top speed (70 km/h) has been reached, it is no longer possible to return to the originally applicable maximum permissible top speed (130 km/h), that is to say the previously applicable buffered top speed (130 km/h) is discarded. The display is accordingly adapted.

If the driver actuates the SET button in state 2, the new applicable maximum permissible top speed (70 km/h) is discarded again and is stored in the buffer. As the currently applicable maximum permissible top speed, the original maximum permissible top speed (130 km/h) buffered in state 2 is used again as the applicable maximum permissible top speed. There is a transition to state 3.

However, if the driver actuates the rocker in state 2, he can still adapt (70 km/h→80 km/h; transition to state 5) the proposed applicable (not yet adjusted) new maximum permissible speed (70 km/h). With the adaptation of the proposed applicable (not yet adjusted) new maximum permissible speed, the buffering of the originally applicable maximum permissible top speed (130 km/h, is discarded and, instead of this, the proposed new maximum permissible top speed (70 km/h) applicable before the adaptation is stored in the buffer.

If the driver now actuates the SET button in state 3 or state 5, the currently applicable maximum permissible top speed (130 km/h in state 3; 80 km/h in state 5) is discarded again in both cases and, as the (new) currently applicable maximum permissible top speed, the proactively detected new maximum permissible top speed (70 km/h) buffered in the respective starting state 3 or 5 is used as the applicable maximum permissible top speed. There is a transition to state 6.

Starting from state 6, adjustment to the now applicable maximum permissible top speed (70 km/h) is carried out after the expiry of a predefined period (without intervention by the driver). There is a transition to state 7.

As a result of the driver assistance system described here, the driver is therefore not only optically or acoustically notified of imminent automatic adaptation of the maximum permissible top speed, but rather also kinesthetically notified of this in a second step. The automatic adaptation of the maximum permissible top speed at the location of the upcoming event is carried out or completed only when the driver does not respond to this.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A longitudinal driver assistance system in a motor vehicle configured for the open-loop or closed-loop control of a drive and/or braking unit of the vehicle, the system comprising:

a capture system configured to detect upcoming relevant events which require adaptation of a predefined maximum permissible top speed, in accordance with which a vehicle speed is controlled by the longitudinal driver assistance system; and a functional unit which is configured to:
   determine, upon detecting an upcoming relevant event and prior to the upcoming relevant event, a longitudinal driver assistance strategy, based on a location of the upcoming event, wherein the strategy identifies: an upcoming first location/time, an upcoming second location/time after the first location/time, and an upcoming third location/time after the second location/time, each of which is before the upcoming event, and
   execute the determined longitudinal driver assistance strategy, wherein execution of the determined longitudinal driver assistance strategy includes:
      (a) upon reaching the first location/time, cause a notification to be output to a driver of the vehicle, wherein the notification notifies the driver that an automatic adaptation of the maximum permissible top speed by the longitudinal driver assistance system to a new maximum permissible top speed is to occur,
      (b) upon reaching the second location/time, cause the longitudinal driver assistance system to intervene in the vehicle speed control to achieve the new maximum permissible top speed by the location of the upcoming relevant event when a driver-initiated refusal of the automatic adaptation of the maximum permissible top speed has not been received by the longitudinal driver assistance system as of reaching the first location or the first time, respectively, and
      (c) until reaching the third location/time, cause the longitudinal driver assistance system to permit the driver-initiated refusal of the automatic adaptation of the maximum permissible top speed.

2. The longitudinal driver assistance system as claimed in claim 1, wherein, upon accepting the driver-initiated refusal of the automatic adaptation of the maximum permissible top speed by the longitudinal driver assistance system, the functional unit is further configured to:
   (i) prevent the automatic adaptation of the maximum permissible top speed by the longitudinal driver assistance system to the new maximum permissible top speed before reaching the third location/time, and
   (ii) prompt cancellation of the intervention in the speed control which has already been started.

3. The longitudinal driver assistance system as claimed in claim 1, wherein, if a permitted driver-initiated refusal of the automatic adaptation of the maximum permissible top speed is detected during the intervention in the longitudinal guidance which has already started in the direction of the new maximum permissible top speed at the location of the upcoming relevant event, the functional unit is further configured to prompt a further intervention in the longitudinal guidance of the motor vehicle in order to reach or maintain a currently-applicable maximum permissible top speed.

4. The longitudinal driver assistance system as claimed in claim 2, wherein, if a permitted driver-initiated refusal of the automatic adaptation of the maximum permissible top speed is detected during the intervention in the longitudinal guidance which has already started in the direction of the new maximum permissible top speed at the location of the upcoming relevant event, the functional unit is further configured to prompt a further intervention in the longitudinal guidance of the motor vehicle in order to reach or maintain a currently-applicable maximum permissible top speed.

5. The longitudinal driver assistance system as claimed in claim 1, wherein, after reaching the second location/time, and if there has not been a permitted driver-initiated refusal of the automatic adaptation of the maximum permissible top speed, the functional unit is further configured to prompt intervention in the longitudinal guidance between the second location/time and the third location/time such that a noticeable acceleration or deceleration in the direction of the new maximum permissible top speed is achieved.

6. The longitudinal driver assistance system as claimed in claim 2, wherein, after reaching the second location/time, and if there has not been a permitted driver-initiated refusal of the automatic adaptation of the maximum permissible top speed, the functional unit is further configured to prompt intervention in the longitudinal guidance between the second location/time and the third location/time such that a noticeable acceleration or deceleration in the direction of the new maximum permissible top speed is achieved.

7. The longitudinal driver assistance system as claimed in claim 3, wherein, after reaching the second location/time, and if there has not been the permitted driver-initiated refusal of the automatic adaptation of the maximum permissible top speed, the functional unit is further configured to prompt intervention in the longitudinal guidance between the second location/time and the third location/time such that a noticeable acceleration or deceleration in the direction of the new maximum permissible top speed is achieved.

8. The longitudinal driver assistance system as claimed in claim 1, wherein the third location/time is identical to a location/time at which the new maximum permissible top speed is adjusted for the first time.

9. The longitudinal driver assistance system as claimed in claim 1, wherein, after reaching the third location/time, the functional unit is configured to not permit the driver-initiated refusal of the automatic adaptation of the maximum permissible top speed.

10. The longitudinal driver assistance system as claimed in claim 2, wherein, after reaching the third location/time, the functional unit is configured to not permit the driver-initiated refusal of the automatic adaptation of the maximum permissible top speed.

11. The longitudinal driver assistance system as claimed in claim 3, wherein, after reaching the third location/time, the functional unit is configured to not permit the driver-initiated refusal of the automatic adaptation of the maximum permissible top speed.

12. The longitudinal driver assistance system as claimed in claim 5, wherein, after reaching the third location/time, the functional unit is configured to not permit the driver-initiated refusal of the automatic adaptation of the maximum permissible top speed.

13. The longitudinal driver assistance system as claimed in claim 1, wherein, in response to a permitted driver-initiated refusal of the automatic adaptation of the maximum permissible top speed, the functional unit is configured to deactivate the notification.

14. The longitudinal driver assistance system as claimed in claim 1, wherein, in response to a permitted driver-initiated refusal of the automatic adaptation of the maximum permissible top speed after beginning the adaptation to the new maximum permissible top speed, the functional unit is configured to permit the automatic adaptation of the maximum permissible top speed to the new maximum permissible top speed again at least for a predefinable period.

15. The longitudinal driver assistance system as claimed in claim 1, wherein the longitudinal driver assistance system is a cruise control system for the closed-loop control of the vehicle's speed to the predefined maximum permissible top speed, and, in the event of the automatic adaptation of the maximum permissible top speed, the functional unit is further configured to prompt open-loop or closed-loop control of the vehicle's speed after the second location/time in order to reach the new maximum permissible top speed at the location of the upcoming relevant event.

16. The longitudinal driver assistance system as claimed in claim 1, wherein the longitudinal driver assistance system is in the form of a speed-limiting system that prevents the maximum permissible top speed from being exceeded, and, in the event of the automatic adaptation of the maximum permissible top speed, the functional unit is further configured to limit the vehicle's speed such that the new maximum permissible top speed is not exceeded at the location of the upcoming relevant event.

* * * * *